US010156850B1

(12) United States Patent
Ansari et al.

(10) Patent No.: US 10,156,850 B1
(45) Date of Patent: Dec. 18, 2018

(54) OBJECT MOTION PREDICTION AND VEHICLE CONTROL SYSTEMS AND METHODS FOR AUTONOMOUS VEHICLES

(71) Applicant: Uber Technologies, Inc., San Francisco, CA (US)

(72) Inventors: Alexander Rashid Ansari, San Francisco, CA (US); Alexander David Styler, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/858,044

(22) Filed: Dec. 29, 2017

Related U.S. Application Data

(60) Provisional application No. 62/596,308, filed on Dec. 8, 2017.

(51) Int. Cl.
*G08G 1/16* (2006.01)
*G05D 1/02* (2006.01)

(52) U.S. Cl.
CPC .......... *G05D 1/0214* (2013.01); *G08G 1/166* (2013.01)

(58) Field of Classification Search
CPC .............................. G05D 1/0214; G08G 1/166
USPC .......................................................... 701/23
See application file for complete search history.

(56) References Cited

U.S. PATENT DOCUMENTS

| | | | | |
|---|---|---|---|---|
| 6,032,097 A * | 2/2000 | Iihoshi | ................ | G08G 1/22 180/168 |
| 6,128,559 A * | 10/2000 | Saitou | ................ | B61L 23/34 340/436 |
| 6,301,530 B1 * | 10/2001 | Tamura | ................ | G05D 1/024 180/168 |
| 7,002,486 B2 | 2/2006 | Lawrence | | |
| 7,899,621 B2 | 3/2011 | Breed et al. | | |
| 8,116,921 B2 * | 2/2012 | Ferrin | ................ | G05D 1/0227 242/390.8 |
| 8,126,642 B2 | 2/2012 | Terpagnier et al. | | |
| 8,457,827 B1 * | 6/2013 | Ferguson | ................ | G05D 1/00 180/169 |

(Continued)

OTHER PUBLICATIONS

"Intelligent Driver Model" Wikipedia, last edited on Jul. 10, 2018, 3 pages.

(Continued)

*Primary Examiner* — Tyler J Lee
(74) *Attorney, Agent, or Firm* — Dority & Manning, PA

(57) ABSTRACT

Systems and methods for determining object motion and controlling autonomous vehicles are provided. In one example embodiment, a computing system can be configured to perform operations. The operations can include obtaining data indicative of state(s) of a first object and a second object within a surrounding environment of an autonomous vehicle. The operations can include determining a first predicted motion trajectory of the first object based at least in part on the state data. The operations can include determining a second predicted motion trajectory of the second object based at least in part on the state data and the first predicted motion trajectory of the first object. The operations can include determining a motion plan for the autonomous vehicle based at least in part on the second predicted motion trajectory of the second object and initiating a motion control in accordance with at least a portion of the motion plan.

20 Claims, 5 Drawing Sheets

(56) References Cited

U.S. PATENT DOCUMENTS

| | | | | |
|---|---|---|---|---|
| 8,510,041 | B1* | 8/2013 | Anguelov | G01C 21/32 701/445 |
| 8,538,656 | B2* | 9/2013 | Yamashiro | B60W 50/029 342/70 |
| 8,706,394 | B2 | 4/2014 | Trepagnier et al. | |
| 8,744,661 | B2* | 6/2014 | Horn | B60W 30/16 340/435 |
| 8,907,814 | B2* | 12/2014 | Chen | G08G 1/096716 340/901 |
| 8,996,224 | B1* | 3/2015 | Herbach | G05D 1/0011 180/116 |
| 9,008,890 | B1* | 4/2015 | Herbach | B60W 30/00 340/435 |
| 9,104,965 | B2 | 8/2015 | Fritsch et al. | |
| 9,302,678 | B2 | 4/2016 | Murphy et al. | |
| 9,373,149 | B2 | 6/2016 | Abhyanker | |
| 9,440,647 | B1 | 9/2016 | Sucan et al. | |
| 9,442,487 | B1 | 9/2016 | Ferguson et al. | |
| 9,665,102 | B2* | 5/2017 | Switkes | G05D 1/0293 |
| 9,799,224 | B2* | 10/2017 | Okamoto | G08G 1/22 |
| 2005/0127242 | A1 | 6/2005 | Rivers | |
| 2006/0195250 | A1* | 8/2006 | Kawaguchi | B60W 30/165 701/117 |
| 2011/0246156 | A1 | 10/2011 | Zecha et al. | |
| 2011/0270514 | A1* | 11/2011 | Shida | B60W 30/16 701/117 |
| 2012/0083960 | A1 | 4/2012 | Zhu et al. | |
| 2013/0030606 | A1* | 1/2013 | Mudalige | G08G 1/22 701/2 |
| 2013/0041567 | A1* | 2/2013 | Yamashiro | B60T 7/22 701/96 |
| 2013/0041576 | A1* | 2/2013 | Switkes | G08G 1/166 701/123 |
| 2013/0218365 | A1* | 8/2013 | Caveney | G05D 1/0295 701/1 |
| 2014/0114885 | A1 | 4/2014 | Han et al. | |
| 2014/0297172 | A1 | 10/2014 | Huelsen | |
| 2014/0309836 | A1 | 10/2014 | Ollis | |
| 2014/0316671 | A1* | 10/2014 | Okamoto | G08G 1/22 701/96 |
| 2014/0316865 | A1* | 10/2014 | Okamoto | G08G 1/22 705/14.1 |
| 2015/0154871 | A1* | 6/2015 | Rothoff | G08G 1/22 701/2 |
| 2016/0297447 | A1* | 10/2016 | Suzuki | B60W 30/16 |
| 2016/0357187 | A1 | 12/2016 | Ansari | |
| 2017/0120804 | A1* | 5/2017 | Kentley | G05D 1/0088 |
| 2017/0132929 | A1* | 5/2017 | Mays | G08G 1/161 |
| 2017/0146563 | A1* | 5/2017 | Braunberger | G01P 15/14 |
| 2017/0168503 | A1* | 6/2017 | Amla | G05D 1/0011 |
| 2017/0186327 | A1* | 6/2017 | Uysal | G08G 1/22 |
| 2017/0244160 | A1* | 8/2017 | Neubecker | G08G 1/087 |
| 2017/0309187 | A1* | 10/2017 | Lin | B60W 30/16 |

OTHER PUBLICATIONS

Malinauskas, Rachel, "The Intelligent Driver Model: Analysis and Application to Adaptive Cruise Control" (2014). *All Theses*, 1934. https://tigerprints.clemson.edu/all_theses/1934.

* cited by examiner

OBJECT MOTION PREDICTION AND VEHICLE CONTROL SYSTEMS AND METHODS FOR AUTONOMOUS VEHICLES

PRIORITY CLAIM

The present application is based on and claims priority to U.S. Provisional Application 62/596,308 having a filing date of Dec. 8, 2017, which is incorporated by reference herein.

FIELD

The present disclosure relates generally to improving the ability of an autonomous vehicle to determine future locations of objects within the vehicle's surrounding environment and controlling the autonomous vehicle with regards to the same.

BACKGROUND

An autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more tangible, non-transitory, computer readable media that collectively store instructions that when executed by the one or more processors cause the computing system to perform operations. The operations include obtaining state data indicative of one or more current or past states of a first object and a second object within a surrounding environment of an autonomous vehicle. In the example, the first object is located ahead of the second object in a travel lane. The operations include determining a first predicted motion trajectory of the first object based at least in part on the state data. The operations include determining a second predicted motion trajectory of the second object based at least in part on the state data and the first predicted motion trajectory of the first object. The second predicted motion trajectory of the second object is indicative of a path that the second object is predicted to travel and an associated timing with which the second object is predicted to travel in accordance with the path. The operations include determining a motion plan for the autonomous vehicle based at least in part on the second predicted motion trajectory of the second object. The operations include causing the autonomous vehicle to initiate a motion control in accordance with at least a portion of the motion plan.

Another example aspect of the present disclosure is directed to a computer-implemented method for determining object motion. The method includes obtaining, by a computing system comprising one or more computing devices, state data indicative of one or more current or past states of a first object and a second object within a surrounding environment of an autonomous vehicle. The method includes determining, by the computing system, a first predicted motion trajectory of the first object based at least in part on the state data. The method includes determining, by the computing system, a second predicted motion trajectory of the second object based at least in part on the state data and the first predicted motion trajectory of the first object. The method includes outputting, by the computing system, data indicative of the second predicted motion trajectory of the second object.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include obtaining state data indicative of one or more current or past states of a first object and a second object. In the example, the first object is located ahead of the second object in a travel lane. The operations include determining a first predicted motion trajectory of the first object based at least in part on the state data. The operations include determining a second predicted motion trajectory of the second object based at least in part on the first predicted motion trajectory of the first object. The operations include determining a motion plan for the autonomous vehicle based at least in part on the second predicted motion trajectory of the second object. The operations include causing the autonomous vehicle to initiate a motion control in accordance with at least a portion of the motion plan.

Other example aspects of the present disclosure are directed to systems, methods, vehicles, apparatuses, tangible, non-transitory computer-readable media, and memory devices for predicting the locations of objects within a surrounding environment of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
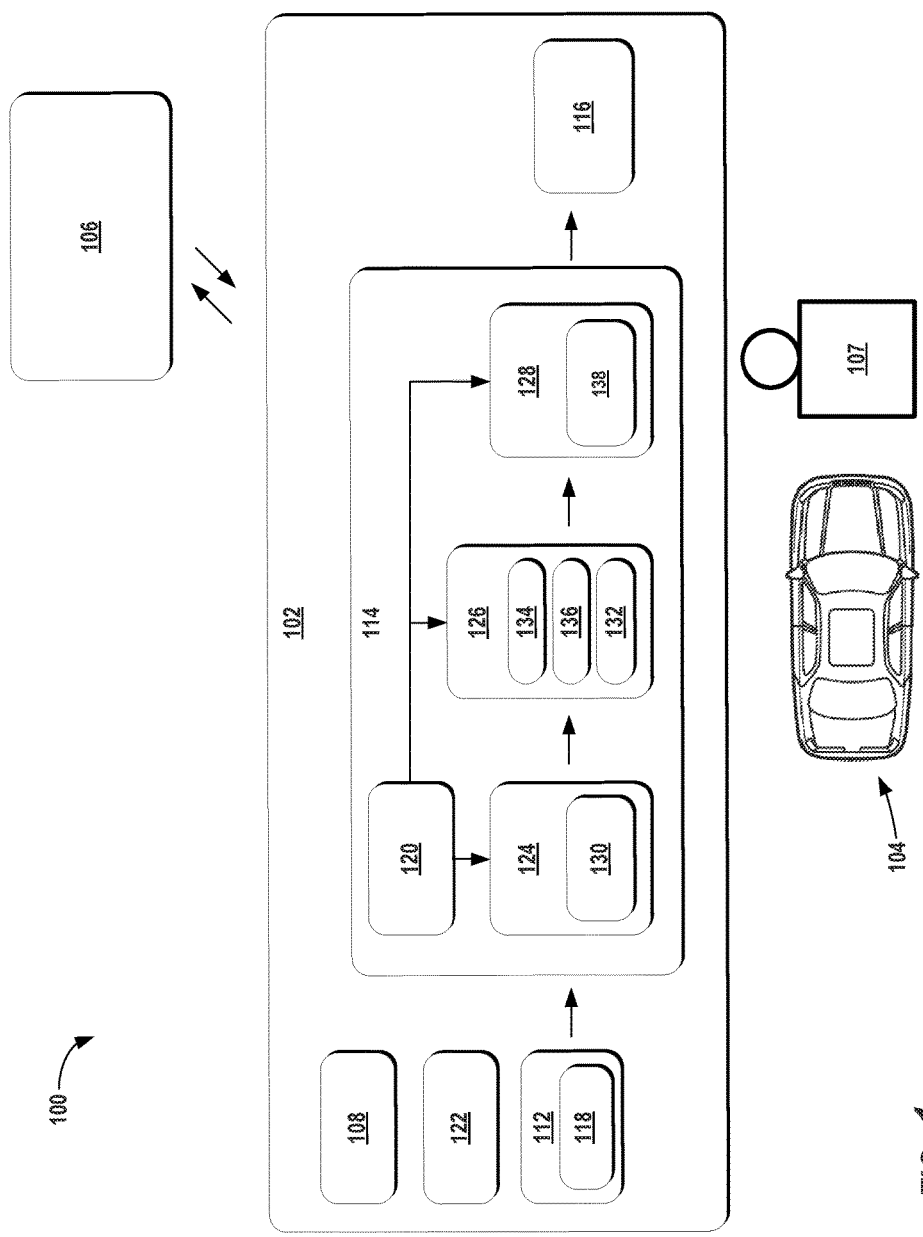
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure.

In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for predicting the future locations of objects that are perceived by autonomous vehicles. In particular, an autonomous vehicle can predict the future location(s) of object(s) based on how those objects are situated within traffic. For instance, using data collected by its onboard sensors, an autonomous vehicle can obtain state data associated with a plurality of objects (e.g., other vehicles, bicycles, etc.) that are within the surrounding environment of the autonomous vehicle. The state data can be indicative of the object type, location, heading, speed, acceleration, etc. For each of these objects, the autonomous vehicle can predict a motion trajectory by which the respective object is predicted to travel. The predicted motion trajectory can be indicative of the path the object is predicted to travel as well as an associated timing. The systems and methods described herein can help the autonomous vehicle determine how the predicted motion trajectories of some objects can affect the trajectories of others (e.g., within the same travel lane).

For example, an autonomous vehicle can identify at least two objects as a lead-follower pair. The lead-follower pair can include a lead object (e.g., a lead vehicle) and a follower object that is positioned behind the lead object in the same travel lane (e.g., a vehicle that is immediately behind the lead vehicle, with no other objects in between). The autonomous vehicle can first develop a predicted motion trajectory of the lead object that indicates the future predicted motion of the lead object (e.g., based on the state data and a lead vehicle model). Then, the autonomous vehicle can develop a predicted motion trajectory of the follower object based on the predicted motion trajectory of the lead object. For example, the autonomous vehicle can determine a predicted motion trajectory of the follower object based on the state data associated with the follower object. The autonomous vehicle can then adjust the predicted motion trajectory of the follower object (e.g., by eliminating trajectory way points, re-timing predicted motion, etc.) based on the predicted motion trajectory of the lead object so that the predicted motion trajectory of the follower object does not indicate a collision with the lead object or encroach on a minimum following distance, while in traffic. In this way, the autonomous vehicle can utilize a simple and accurate approach to predicting the future location(s) of objects that are within traffic and proximate to the autonomous vehicle. This can improve the motion planning ability or other control of the autonomous vehicle, thereby enhancing passenger safety and vehicle efficiency.

More particularly, an autonomous vehicle can be a ground-based autonomous vehicle (e.g., truck, car, bus, etc.) or another type of vehicle (e.g., aerial vehicle) that can operate with minimal and/or no interaction from a human operator. The autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain, etc.), and/or other systems. The sensor(s) can gather sensor data (e.g., image data, RADAR data, LIDAR data, etc.) associated with the surrounding environment of the vehicle. For example, the sensor data can include LIDAR point cloud(s) and/or other data associated with one or more object(s) that are proximate to the autonomous vehicle (e.g., within a field of view of the sensor(s)) and/or one or more geographic features of the geographic area (e.g., curbs, lane markings, sidewalks, etc.). The object(s) can include, for example, other vehicles, pedestrians, bicycles, etc. The object(s) can be static objects (e.g., not in motion) or actor objects (e.g., dynamic objects in motion or that will be in motion). The sensor data can be indicative of characteristics (e.g., locations) associated with the object(s) at one or more times. The sensor(s) can provide such sensor data to the vehicle's autonomy computing system.

In addition to the sensor data, the vehicle computing system can obtain other types of data associated with the surrounding environment in which the objects (and/or the autonomous vehicle) are located. For example, the vehicle computing system can obtain map data that provides detailed information about the surrounding environment of the autonomous vehicle. The map data can provide information regarding: the identity and location of different roadways, road segments, buildings, sidewalks, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, laws/rules, or other traffic control devices); the location of obstructions (e.g., roadwork, accident, etc.); data indicative of events (e.g., scheduled concerts, parades, etc.); and/or any other map data that provides information that assists the vehicle computing system in comprehending and perceiving its surrounding environment and its relationship thereto.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect the object(s) that are within the surrounding environment of the autonomous vehicle as well as state data associated therewith. For example, the vehicle computing system can obtain state data indicative of one or more states (e.g., current or past state(s)) of a plurality of objects within a surrounding environment of the autonomous vehicle. For example, the state data for each object can describe (e.g., at a given time, time period, etc.) an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information.

The prediction system can be configured to predict the motion of the object(s) within the surrounding environment of the autonomous vehicle. For instance, the prediction system can create prediction data associated with the object(s). The prediction data can be indicative of one or more predicted future locations of each respective object. For example, the prediction system can determine a predicted motion trajectory along which a respective object is predicted to travel over time. A predicted motion trajectory can be indicative of a path that the object is predicted to travel and an associated timing with which the object is predicted to traverse the path. The predicted path can include and/or be made up of a plurality of way points. In some implementations, the prediction data can be indicative of the speed and/or acceleration at which the object is predicted to travel along the predicted motion trajectory.

The autonomous vehicle (e.g., the prediction system) can be configured to predict the motion of object(s) that are within in traffic. This can include, for instance, the motion of objects that are in a lead-follower relationship. By way of example, the autonomous vehicle can obtain state data associated with a first object and a second object within the surrounding environment of the autonomous vehicle. The autonomous vehicle can identify the first and second objects as being associated with a lead-follower object relationship (e.g., a lead-follower object pair). A lead-follower relationship can include, for example, a set of objects that are located and/or are travelling in a manner in which one object is ahead of another object, without other intermediate objects located between them. In the lead-follower relationship, a lead object can affect the motion of the follower object (e.g., which is forced to stop, decelerate, queue behind, etc. the lead object to avoid collision). For example, based at least in part on the acquired state data, the autonomous vehicle can identify that the first object and second object are within the same travel lane. This can be a travel lane in which the autonomous vehicle is also located. The autonomous vehicle can determine that the first object is a lead object based on its position within a travel lane ahead of the second object (e.g., without other objects in between these objects). In some implementations, the autonomous vehicle can consider the first object a lead object in the event that there is not another object in front of the lead object in the same travel lane (e.g., within a distance threshold). In some implementations, the autonomous vehicle can consider an object a lead object in the event that object is the furthest object that the autonomous vehicle can perceive based on line of sight (e.g., although there may be another object in front of it). In some implementations, the autonomous vehicle can determine that the second object is a follower object, for example, because the second object is travelling behind (e.g., immediately behind) and in the same direction as the lead object (e.g., within the same travel lane).

In some implementations, a lead-follower relationship can include more than two objects. For instance, the second object (e.g., a follower object with respect to the first object) can, in turn, be a lead object to a third object that is behind (e.g., immediately behind) the second object. The third object can be considered a follower object with respect to the second object.

The autonomous vehicle can sequentially predict the future motion of the objects in a lead-follower relationship. For instance, the autonomous vehicle can determine the predicted motion trajectories of objects in an iterative manner that begins with the front-most object of the lead-follower relationship and continues to the last object of the lead-follower relationship.

The autonomous vehicle can determine a predicted motion trajectory of the first object in a lead-follower relationship (e.g., the lead object) based at least in part on the state data associated with the first object. To do so, the autonomous vehicle can determine the first predicted motion trajectory of the first object based at least in part on a first model (e.g., a lead vehicle model). The first model can be a rule(s)-based model that can be used to model the predicted motion of a lead object. Such a model can include heuristics that describe the "free road" behavior of the first object within a travel lane (e.g., how a lead vehicle without an object in front of it). In some implementations, the first model can include ballistics-type prediction heuristics that propagate the current state of an object (e.g., the current velocity, heading, etc.) forward within the travel lane (e.g., until it reaches a lane travel speed). In some implementations, the first model can include heuristics that consider the current acceleration of an object when predicting the motion of the object. In some implementations, the first model can include a traffic-flow model (e.g., a driver intelligent model with an infinite minimum following distance, other models, etc.). In some implementations, the first model can include a machine-learned model that is trained to predict the motion of a lead object.

In some implementations, the autonomous vehicle can select the first model from among a plurality of models that are stored in an accessible memory onboard and/or remote from the autonomous vehicle. For instance, the autonomous vehicle can determine the type of the first object (e.g., a car vs. a truck vs. a motorcycle) and/or that the first object is a lead object based at least in part on the state data associated with the first object. The autonomous vehicle can select the most appropriate model (from a plurality of available models) for predicting the motion of a lead object of that particular object type. By enabling the autonomous vehicle to select a certain model based on the particular object of interest, the system and methods of the present disclosure can provide the autonomous vehicle with computational flexibility to leverage the most appropriate models for a given circumstance.

The autonomous vehicle can determine a predicted motion trajectory of a second object (e.g., the follower object) based at least in part on the state data associated with the second object as well as the predicted motion trajectory of the first object (e.g., the lead object). As described herein, the predicted motion trajectory of the second object can be indicative of a path that the second object is predicted to travel and an associated timing with which the second object is predicted to travel in accordance with the path. The autonomous vehicle can determine a predicted motion trajectory of the second object based at least in part on the state data associated with the second object and, then, adjust the predicted motion trajectory of the second object based at least in part on the predicted motion trajectory of the first object. For example, the autonomous vehicle can adjust the associated timing with which the second object is predicted to travel along the predicted path (e.g., re-time the predicted object motion) such that the second object is not predicted to traverse the path in a manner that would result in a collision. Additionally, or alternatively, the autonomous vehicle can remove one or more way points from the predicted path based at least in part on the predicted motion trajectory of the first object. This can include, for example, the removal of the way point(s) that would overlap and/or intersect with the first object and/or its predicted motion trajectory. Such removal can be based on the assumption that a follower object will travel in a manner to avoid a collision with a lead object.

The autonomous vehicle can determine the predicted trajectory of the second object based at least in part on a second model (e.g., a follower vehicle model). The second model can be a rule(s)-based model that can be used to model the predicted motion of a follower object. Such a model can include heuristics that describe how the motion of an object can be affected by the motion of another object. For example, the heuristics can be used to determine how an object that is located behind another object (e.g., a lead object) will move within a travel lane with respect to the other object. For instance, the second model can predict that the second object (e.g., a follower object) will accelerate within a travel lane up to a speed that approaches the first object (e.g., the lead object) but does not collide with the first object and/or travel within a certain following distance.

In some implementations, the second model can include a traffic-flow model. For example, the autonomous vehicle can determine one or more parameters associated with the second object. The parameters can include a desired velocity of the object (e.g., travel lane speed), a minimum distance between the second object and the object in front of it (e.g., the first, lead object), desired time headway, acceleration, braking deceleration, and/or other parameters. The autonomous vehicle can utilize these parameters with the second model (e.g., an intelligent driver model, other traffic-flow models, etc.) to determine a predicted trajectory of the second object. The second model can also consider the predicted trajectory of the first object and adjust the predicted trajectory of the second object accordingly, as described herein (e.g., to avoid a predicted collision, to avoid encroaching on a minimum following distance, etc.). In some implementations, the output of the first model (e.g., data indicative of the predicted motion trajectory of the first object) can be an input into the second model. As described herein, the autonomous vehicle can determine the predicted path associated with the second object based on the state data and the associated timing based at least in part on the predicted motion trajectory of the first object. For instance, in some implementations, the autonomous vehicle can utilize a model to determine the predicted path of the second object (e.g., based on inputted state data) and another model to determine the associated timing (e.g., based on input data indicative of the predicted motion trajectory of the first object). In some implementations, the second model can include a machine-learned model that is trained to predict the motion trajectory of a follower object.

In some implementations, the autonomous vehicle can select the second model from among a plurality of models that are stored in an accessible memory onboard and/or remote from the autonomous vehicle. For instance, the autonomous vehicle can determine the type of the second object and/or that the second object is a follower object based at least in part on the state data associated with the second object. The autonomous vehicle can select an appropriate model (from a plurality of available models) for predicting the motion of a follower object of that particular object type (e.g., a follower vehicle). Again, this can provide the autonomous vehicle with computational flexibility to pick and choose the most appropriate models for a given scenario.

The autonomous vehicle can determine a motion plan based at least in part on the predicted motion trajectory of the first object and/or the predicted motion trajectory of the second object. For instance, the prediction system can output data indicative of the predicted motion trajectory of the first object and/or the predicted motion trajectory of the second object to the motion planning system of the autonomous vehicle. The motion planning system can determine a motion plan based at least in part on such data. A motion plan can include vehicle actions (e.g., planned vehicle trajectories, speed(s), acceleration(s), other actions, etc.) with respect to the objects within the vehicle's surrounding environment as well as the objects' predicted movements. For instance, the motion planning system can implement an optimization algorithm, model, etc. that considers cost data associated with a vehicle action as well as other objective functions (e.g., cost functions based on speed limits, traffic lights, etc.), if any, to determine optimized variables that make up the motion plan. The motion planning system can determine that the vehicle can perform a certain action (e.g., pass an object) without increasing the potential risk to the vehicle and/or violating any traffic laws (e.g., speed limits, lane boundaries, signage). For instance, the motion planning system can evaluate each of the predicted motion trajectories of the first and/or second objects during its cost data analysis as it determines an optimized vehicle trajectory through the surrounding environment. In some implementations, one or more of the predicted motion trajectories may not ultimately change the motion of the autonomous vehicle (e.g., due to an overriding factor such as a jaywalking pedestrian). In some implementations, the motion plan may define the vehicle's motion such that the autonomous vehicle avoids the first and/or second object(s), reduces speed to give more leeway such object(s), proceeds cautiously, performs a stopping action, etc.

The autonomous vehicle can initiate a motion control in accordance with at least a portion of the motion plan. For instance, the motion plan can be provided to the vehicle control system(s) of the autonomous vehicle. The vehicle control system(s) can be associated with a vehicle controller (e.g., including a vehicle interface) that is configured to implement the motion plan. The vehicle controller can, for example, translate the motion plan into instructions for the appropriate vehicle control component (e.g., acceleration control, brake control, steering control, etc.). This can allow the autonomous vehicle to autonomously travel while taking into account the objects and their traffic interactions within the vehicle's surrounding environment (e.g., the lead/follower objects within the vehicle's travel lane).

The systems and methods described herein provide a number of technical effects and benefits. For instance, the present disclosure provides systems and methods for improved predictions of object trajectories within the surrounding environment of an autonomous vehicle and improved vehicle control. The improved ability to determine how objects will act in traffic (e.g., in lead-follower relationships) can enable improved motion planning and/or other control of the autonomous vehicle based on such determinations. Thus, the present disclosure improves the operation of an autonomous vehicle computing system and the autonomous vehicle it controls. In addition, the present disclosure provides a particular solution to the problem of predicting how object will react to traffic scenarios (e.g., in-lane congestion, lead-follower relationships, etc.) and the resultant trajectories and provides a particular way (e.g., sequential calculation approach, use of various models, etc.) to achieve the desired outcome. The present disclosure also provides additional technical effects and benefits, including, for example, enhancing passenger/vehicle safety and improving vehicle efficiency by reducing collisions.

The systems and methods of the present disclosure also provide an improvement to vehicle computing technology, such as autonomous vehicle computing technology. For instance, the systems and methods enable the vehicle technology to better predict how an object will act within a traffic scenario (e.g., a congested traffic scenario with lead-follower relationships) and the potential motion trajectories that such an object may follow as a result. In particular, a computing system (e.g., a vehicle computing system) can obtain state data indicative of one or more current or past states of a first and second object within a surrounding environment of an autonomous vehicle. The computing system can identify the first object and the second object as associated with a lead-follower object relationship. For example, the first object can be located ahead (e.g., immediately ahead) of the second object within a travel lane. The first object can be a lead object (e.g., a lead vehicle) and the second object can be a follower object (e.g., a follower vehicle within the same travel lane). The computing system can determine a first predicted motion trajectory of the first object based at least in part on the state data (e.g., state data associated with the first object). The computing system can determine a second predicted motion trajectory of the second object based at least in part on the state data (e.g., associated with the second object) and the first predicted motion trajectory of the first object. The computing system can output data indicative of the first predicted motion trajectory of the first object and the second predicted motion trajectory of the second object (e.g., to the motion planning system, local memory, etc.). Moreover, the computing system can determine a motion plan based on at least one of the predicted motion trajectories and cause the vehicle to initiate a motion control in accordance with at least a portion of the motion plan. By identifying object trajectories based on the relationship of the objects within a traffic scenario (e.g., lead-follower relationship), the computing system can plan vehicle motion based on the informed knowledge that predicted object motion trajectory of one object may be affected by the predicted motion trajectory of another object within the surrounding environment. Moreover, by sequentially determining the predicted motion trajectories of objects (e.g., from the lead object to the follower objects, etc.), the computing system can more accurately determine the predicted motion trajectories of these objects. Accordingly, the systems and methods of the present disclosure improve the ability of a vehicle computing system to predict the motion of objects within its surrounding environment, while also improving the ability to control the autonomous vehicle. For example, this may be used to alter autonomous vehicle behavior near these objects such as, for example, to be more conservative to avoid any interference with the objects.

With reference now to the FIGS., example embodiments of the present disclosure will be discussed in further detail. FIG. 1 illustrates an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users 107. The vehicle service(s) can include transportation services (e.g., rideshare services in which user rides in the vehicle 104 to be transported), courier services, delivery services, and/or other types of services. The vehicle service(s) can be offered to the users 107 by the entity, for example, via a software application (e.g., a mobile phone software application). The entity can utilize the operations computing system 106 to coordinate and/or manage the vehicle 104 (and its associated fleet, if any) to provide the vehicle services to a user 107.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104 (and/or a user device). The computing device(s) of the operations computing system 106 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 106 (e.g., the one or more processors, etc.) to perform operations and functions, such as providing data to and/or receiving data from the vehicle 104, for managing a fleet of vehicles (that includes the vehicle 104), etc.

The vehicle 104 incorporating the vehicle computing system 102 can be various types of vehicles. For instance, the vehicle 104 can be a ground-based autonomous vehicle such as an autonomous car, autonomous truck, autonomous bus, etc. The vehicle 104 can be an air-based autonomous vehicle (e.g., airplane, helicopter, or other aircraft) or other types of vehicles (e.g., watercraft, etc.). The vehicle 104 can be an autonomous vehicle that can drive, navigate, operate, etc. with minimal and/or no interaction from a human operator (e.g., driver). In some implementations, a human operator can be omitted from the vehicle 104 (and/or also omitted from remote control of the vehicle 104). In some implementations, a human operator can be included in the vehicle 104.

In some implementations, the vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator present in the vehicle 104 and/or remote from the vehicle 104). The vehicle 104 can operate in a semi-autonomous operating mode in which the vehicle 104 can operate with some input from a human operator present in the vehicle 104 (and/or a human operator that is remote from the vehicle 104). The vehicle 104 can enter into a manual operating mode in which the vehicle 104 is fully controllable by a human operator (e.g., human driver, pilot, etc.) and can be prohibited and/or disabled (e.g., temporary, permanently, etc.) from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator of the vehicle 104.

The operating modes of the vehicle 104 can be stored in a memory onboard the vehicle 104. For example, the operating modes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send data to the vehicle 104 instructing the vehicle 104 to enter into, exit from, maintain, etc. an operating mode. By way of example, the operations computing system 106 can send data to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 104 (e.g., its computing system, one or more processors, etc.) to perform operations and functions, such as those described herein for determining object motion, controlling vehicle motion, etc.

The vehicle 104 can include a communications system 108 configured to allow the vehicle computing system 102 (and its computing device(s)) to communicate with other computing devices. The vehicle computing system 102 can use the communications system 108 to communicate with the operations computing system 106 and/or one or more other computing device(s) over one or more networks (e.g., via one or more wireless signal connections). In some implementations, the communications system 108 can allow communication among one or more of the system(s) onboard the vehicle 104. The communications system 108 can include any suitable components for interfacing with one or more network(s), including, for example, transmitters, receivers, ports, controllers, antennas, and/or other suitable components that can help facilitate communication.

As shown in FIG. 1, the vehicle 104 can include one or more vehicle sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 112 can be configured to acquire sensor data 118 associated with one or more objects that are within the surrounding environment of the vehicle 104. For instance, the sensor data 118 can be acquired for object(s) that are within a field of view of one or more of the vehicle sensor(s) 112. The vehicle sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the vehicle sensor(s) 112. The object(s) can include, for example, vehicles, pedestrians, bicycles, and/or other objects. The object(s) can be located in front of, to the rear of, to the side of the vehicle 104, etc. The sensor data 118 can be indicative of locations associated with the object(s) within the surrounding environment of the vehicle 104 at one or more times. The vehicle sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the vehicle sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the vehicle sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The vehicle computing system 102 (e.g., the autonomy system 114) can identify one or more objects that are proximate to the vehicle 104 based at least in part on the sensor data 118 and/or the map data 120. For example, the vehicle computing system 102 (e.g., the perception system 124) can process the sensor data 118, the map data 120, etc. to obtain state data 130. The vehicle computing system 102 can obtain state data 130 that is indicative of one or more states (e.g., current and/or past state(s)) of a plurality of objects that are within a surrounding environment of the vehicle 104. For example, the state data 130 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 124 can provide the state data 130 to the prediction system 126.

The prediction system 126 can be configured to predict a motion of the object(s) within the surrounding environment of the vehicle 104. For instance, the prediction system 126 can create prediction data 132 associated with such object(s). The prediction data 132 can be indicative of one or more predicted future locations of each respective object. For example, the prediction system 136 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 132 can be indicative of the speed and/or acceleration at which the respective object is predicted to travel along its associated predicted motion trajectory. The vehicle computing system 102 (e.g., the prediction system 126) can be configured to predict the motion of object(s) that are within in traffic. This can include, for instance, the motion of objects that are located within the same travel lane.

Figure 2:
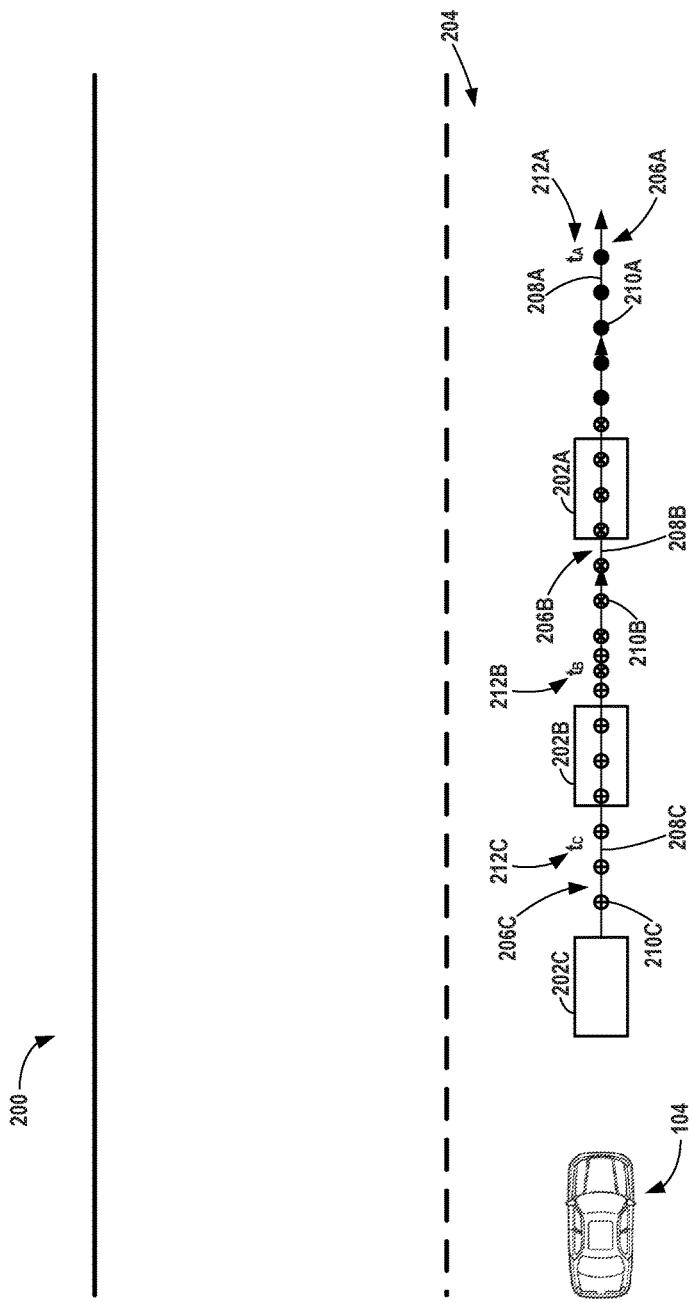
FIGS. 2-3 depict an example environment of an autonomous vehicle with a plurality of objects according to example embodiments of the present disclosure.

FIG. 2 depicts example environment 200 of a vehicle 104 according to example embodiments of the present disclosure. As described herein, the vehicle computing system 102 can obtain state data 130 indicative of one or more current or past states of a plurality of objects 202A-C within a surrounding environment 200 of the vehicle 104. The plurality of objects 202A-C can include a first object 202A, a second object 202B, and/or a third object 202C. The vehicle computing system 102 can obtain state data 130 indicative of one or more current or past states of a first object 202A, a second object 202B, and/or a third object 202C within the surrounding environment 200 of the vehicle 104. For example, the vehicle computing system 102 can obtain first state data associated with the first object 202A (e.g., a first portion of the state data 130), second state data associated with the second object 202B (e.g., a second portion of the state data 130), third state data associated with the third object 202C (e.g., a third portion of the state data 130). As shown in FIG. 2, the first object 202A can be located ahead of the second object 202B in a travel lane 204 (e.g., the same travel lane). For instance, the first object 202A can be located immediately ahead of the second object 202B (e.g., without other objects in between the first and second objects 202A-C) in the travel lane 204. Moreover, the second object 202B can be located ahead (e.g., immediately ahead) of the third object 202C in the travel lane 204.

The vehicle computing system 102 can be configured to determine which of the objects within its surroundings are situated in a manner such that the motion of one object may affect the motion of another. For instance, the vehicle computing system 102 can determine the existence of a lead-follower relationship within the surrounding environment 200 of the vehicle 104 (e.g., based at least in part on the state data 130). In the lead-follower relationship, one object (e.g., a lead object) can affect the motion of another object (e.g., a follower object), which can be forced to stop, decelerate, queue, etc. (e.g., with respect to the lead object to avoid getting too close and/or collision). For example, a lead-follower relationship can include at least two objects that are located and/or are travelling in a manner in which one object is ahead of another object (e.g., without other intermediate objects located between them).

A lead-follower relationship can exist for instance among a plurality of objects that are located within the same travel lane. By way of example, the vehicle computing system 102 can identify the first object 202A and the second object 202B as being associated with a lead-follower relationship (e.g., a lead-follower object pair) based at least in part on the state data 130. The vehicle computing system 102 can determine that the first object 202A and the second object 202B are located (and/or travelling) within the same travel lane 204 based at least in part on the acquired state data 130 (e.g., the first state data, second state data, etc.) and/or other data (e.g., map data 120 indicative of the boundaries of the travel lane 204). In some implementations, the travel lane 204 can be the travel lane in which the vehicle 104 is located. In some implementations, the vehicle 104 may not be located within the travel lane 204 in which the object(s) are located.

The vehicle computing system 102 can identify the first object 202A as a lead object. For example, the vehicle computing system 102 can determine a position of the first object 202A based at least in part on the state data 130 associated with the first object 202A. The vehicle computing system 102 can determine that the first object 202A is positioned within a travel lane 204 ahead of the second object 202B (e.g., immediately ahead of the second object 202B without other objects in between these objects). In some implementations, the vehicle computing system 102 can determine that the first object 202A is a lead object in the event that there is not another object in front of the first object 202A in the same travel lane (e.g., within a distance threshold). In some implementations, the vehicle computing system 102 can consider the first object 202A as a lead object in the event that the first object 202A is the furthest object that the vehicle can perceive based on line of sight of the vehicle's sensor(s) 112 (e.g., although there may be another object in front of it). As such, different types of vehicles can determine different lead objects due to changes in line of sight. For example, an autonomous truck may perceive an object that is further away from the truck as a lead object than may be perceived by an autonomous car (e.g., due to a greater line of sight of the truck).

The autonomous vehicle can identify the second object 202B as a follower object with respect to the first object 202A (e.g., the lead object). For example, the vehicle computing system 102 can determine a position of the second object 202B based at least in part on the state data 130 associated with the second object 202B. The vehicle computing system 102 can determine that the second object 202B is positioned behind the first object 202A (e.g., immediately behind the first object 202A without other objects in between these objects) within the travel lane 204 (e.g., the same travel lane as the first object 202A). The vehicle computing system 102 can determine that the second object 202B is travelling in the same direction as the first object 202A (e.g., the lead object) within the travel lane 204. Additionally, or alternatively, the vehicle computing system 102 can determine that the second object 202B is located within a threshold distance of the first object 202A (e.g., within the travel lane 204). These types of characteristics can be indicative of a follower object that may have its motion affected by a lead object.

In some implementations, a lead-follower relationship can include more than two objects. For instance, the second object 202B (e.g., a follower object with respect to the first object 202A) can, in turn, be a lead object with respect to a third object 202C. The third object 202C can be located behind (e.g., immediately behind) the second object 202B within the travel lane 204. The third object 202C can be considered a follower object with respect to the second object 202B. The vehicle computing system 102 can identify the third object 202C as a follower object based at least in part on the state data 130 associated with the third object (e.g., third state data indicative of the position, heading, velocity, etc. of the third object 202C).

The vehicle computing system 102 can be configured to predict the future motion of the objects that are in a lead-follower relationship. The vehicle computing system 102 can sequentially determine the predicted motion trajectories of the objects 202A-C located within the travel lane 204. For instance, the vehicle computing system 102 can determine the predicted motion trajectories of the objects 202A-C in an iterative manner that begins with the front-most object (e.g., the first object 202A) of the lead-follower relationship and continues to the last object of the lead-follower relationship (e.g., the third object 202C). In some implementations, the vehicle computing system 102 can determine the predicted motion trajectories of a portion of the objects associated with the lead-follower relationship. The vehicle computing system 102 can determine the predicted motion trajectory of the lead object in a lead-follower relationship (e.g., based on state data 130). Then, the vehicle computing system 102 can determine the predicted motion trajectory of the follower objects. The predicted motion trajectories of the follower objects can be developed based at least in part on the potential effects that the predicted motion trajectory of one or more previous objects (e.g., the lead object) may have on the respective motion trajectory of that follower object.

For instance, the vehicle computing system 102 can determine a first predicted motion trajectory 206A of the first object 202A based at least in part on the state data 130 (e.g., the first state data associated with the first object 202A). The first predicted motion trajectory 206A can be indicative of a first path 208A that the first object 202A is predicted to travel. The first path 208A can include and/or be made up of a plurality of first way points 210A. The first predicted motion trajectory 206A can also be indicative of an associated first timing 212A with which the first object 202A is predicted to travel in accordance with the first path 208A.

The vehicle computing system 102 can determine the first predicted motion trajectory 206A of the first object 202A based at least in part on a first model 134 (shown in FIG. 1). The first model 134 can be a lead vehicle model. For instance, the first model 134 can be or otherwise include a rule(s)-based model that can be used to model the predicted motion of a lead object. In some implementations, such a model can include heuristics that describe the "free road" behavior of a lead object within a travel lane (e.g., how a lead vehicle without an object in front of it). In some implementations, the first model can include ballistics-type prediction heuristics that propagate the current state of an object (e.g., the current velocity, heading, etc.) forward within the travel lane (e.g., until it reaches a lane travel speed). In some implementations, the first model 134 can include heuristics that consider the current acceleration of an object when predicting the motion of the object. In some implementations, the first model 134 can be or otherwise include a traffic-flow model (e.g., a driver intelligent model with an infinite minimum following distance, other traffic-flow models, etc.). In some implementations, the first model 134 can take into account that the lead object may have an object in front of it (e.g., due to limitations in the vehicle's line of sight). In some implementations, the first model 134 can be associated with a particular type of environment in which the objects and/or the vehicle 104 is located (or will be located). This can include a model associated with an urban environment (e.g., that predicts the motion of an object under an urban setting), a model associated with a highway environment (e.g., that predicts the motion of an object on a highway), a model associated with a rural setting, etc. In some implementations, the first model 134 can include a machine-learned model that is trained to predict the motion of a lead object.

In some implementations, the vehicle computing system 102 can select the first model 134 for the first object 202A (e.g., a lead object) from a plurality of models that are stored in an accessible memory onboard and/or remote from the vehicle 104. The vehicle computing system 102 can select the first model 134 for the first object 202A based on state data 130 (e.g., the first state data associated with the first object 202A). For instance, as described herein, the vehicle computing system 102 can determine that the first object 202A is a lead object based at least in part on the state data 130 (e.g., the first state data associated with the first object 202A). The vehicle computing system 102 can determine a first type of the first object (e.g., a car vs. a truck vs. a motorcycle) based at least in part on the state data 130 (e.g., the first state data associated with the first object 202A). The vehicle computing system 102 can select the first model 134 (e.g., the lead vehicle model) based at least in part on a first type of the first object 202A. For example, the vehicle computing system 102 can select the first model 134 in the event that it is the most appropriate model (from a plurality of available models) for predicting the motion of a lead object that is the same type of object as the first object 202A. In some implementations, the vehicle 104 can select the first model 134 based at least in part on the environment in which the vehicle 104 and/or first object 202A is located (e.g., a model for an urban environment, highway environment, rural environment, etc.). The vehicle computing system 102 can determine the environment (e.g, the type of environment) based at least in part on sensor data 118, map data 120, and/or other data. The vehicle computing system 102 can select a model based at least in part on the of environment. Accordingly, the vehicle computing system can be afforded a greater amount of computational flexibility to leverage the most appropriate models for a particular object of interest as well as its setting.

The vehicle computing system 102 can input data into the first model 134 and receive an output. For instance, the vehicle computing system 102 can input the state data 130 associated with the first object 202A (e.g., the first state data) into the first model 134 (e.g., the lead vehicle model). The vehicle computing system 102 can process the state data 130 utilizing the first model 134 to determine the predicted motion trajectory 206A of the first object 202A. For example, an output of the first model 134 can include the first predicted path 208A of the first object 202A, the first way points 210A, and/or the first timing 212A. Such information can be utilized to develop the predicted motion trajectories of the other objects.

The vehicle computing system 102 can determine a second predicted motion trajectory 206B of the second object 202B (e.g., a follower object) based at least in part on the state data 130 (e.g., the second state data) and the first predicted motion trajectory 206A of the first object 202A (e.g., a lead object). The second predicted motion trajectory 206B of the second object 202B can be indicative of a second path 208B that the second object 202B is predicted to travel. The second path 208B that the second object 202B is predicted to travel can include or be made up of a plurality of second way points 210B. The second predicted motion trajectory 206B of the second object 202B can be indicative of an associated second timing 212B with which the second object 202B is predicted to travel in accordance with the second path 208B.

The vehicle computing system 102 can determine the second predicted motion trajectory 206B of the second object 202B based at least in part on a second model 136 (shown in FIG. 1). The second model 136 can be different than the first model 134. The second mode 136 can be, for example, a follower vehicle model. The second model 134 can be a rule(s)-based model that can be used, for example, to model the predicted motion of an object based on the predicted motion of another object (e.g., to model the predicted motion of a follower object based on the predicted motion of a lead object). For instance, such a model can include heuristics that describe how an object (e.g., a follower object) that is or will be located behind another object (e.g., a lead object) will move (e.g., within a travel lane) with respect to the other object. For example, the second model 136 can predict that the second object 202A (e.g., a follower object) will accelerate within the travel lane 204 up to a speed that approaches the first object 202A (e.g., the lead object) but does not collide with the first object 202A and/or encroach a minimum following distance.

In some implementations, the second model 136 can include a traffic flow model. For example, the vehicle computing system 102 can determine one or more parameters associated with the second object 202B. The parameters can include a desired velocity of the second object 202A (e.g., travel lane speed), a minimum distance between the second object 202A and the object in front of it (e.g., the first object 202A, a lead object), desired time headway, acceleration, braking deceleration, and/or other parameters. The vehicle computing system 102 can utilize these parameters with the second model 136 (e.g., an intelligent driver model, other traffic flow models, etc.) to determine the second predicted motion trajectory 206B of the second object 202B. The second model 136 can also consider the first predicted trajectory 206A of the first object 202A and adjust the second predicted motion trajectory 206B of the second object 202B accordingly, as described herein (e.g., to avoid a predicted collision, moving within a minimum distance, etc.). In some implementations, an output of the first model 134 (e.g., data indicative of the first predicted motion trajectory 206A of the first object 202A) can be utilized as an input into the second model 136. In some implementations, the second model 136 can include a machine-learned model that is trained to predict the motion trajectory of a follower object.

In some implementations, the vehicle computing system 102 can utilize more than one model to determine the second predicted motion trajectory 206B of the second object 202B. For example, as described herein, the vehicle computing system 102 can determine the second predicted path 208B associated with the second object 202B based at least in part on the state data 130 (e.g., associated with the second object 202B) and the associated second timing 212B based at least in part on the first predicted motion trajectory 206A of the first object 202A. In some implementations, the autonomous vehicle can utilize a model to determine the second path 208B of the second object 202B (e.g., based on inputted state data) and another model to determine the associated second timing 212B (e.g., based at least in part on input data indicative of the predicted motion trajectory 206A of the first object 202A).

In some implementations, the vehicle computing system 102 can select the second model 136 for the second object 202B (e.g., a follower object) from a plurality of models that are stored in an accessible memory onboard and/or remote from the vehicle 104. The vehicle computing system 102 can select the second model 136 for the second object 202B based on state data 130 (e.g., the second state data associated with the second object 202A). For instance, the vehicle computing system 102 can determine that the second object 202B is a follower object based at least in part on the state data 130 (e.g., the second state data associated with the second object 202B). The vehicle computing system 102 can determine a second type of the second object 202B (e.g., a car vs. a truck vs. a motorcycle) based at least in part on the state data 130 (e.g., the second state data associated with the second object 202B). The vehicle computing system 102 can select the second model 136 (e.g., the follower vehicle model) based at least in part on a second type of the second object 202B. For example, the vehicle computing system 102 can select the second model 136 as the most appropriate model (from a plurality of available models) for predicting the motion of a follower object that is the same type of object as the second object 202B. In some implementations, the vehicle computing system 102 can select the second model 136 based at least in part on the environment (e.g., as determined by map data, sensor data, etc.) in which the vehicle 104 and/or the second object 202B is located, as similar described herein. Again, this can provide the vehicle computing system 102 with computational flexibility to pick and choose the most appropriate models for a given scenario.

Figure 3:
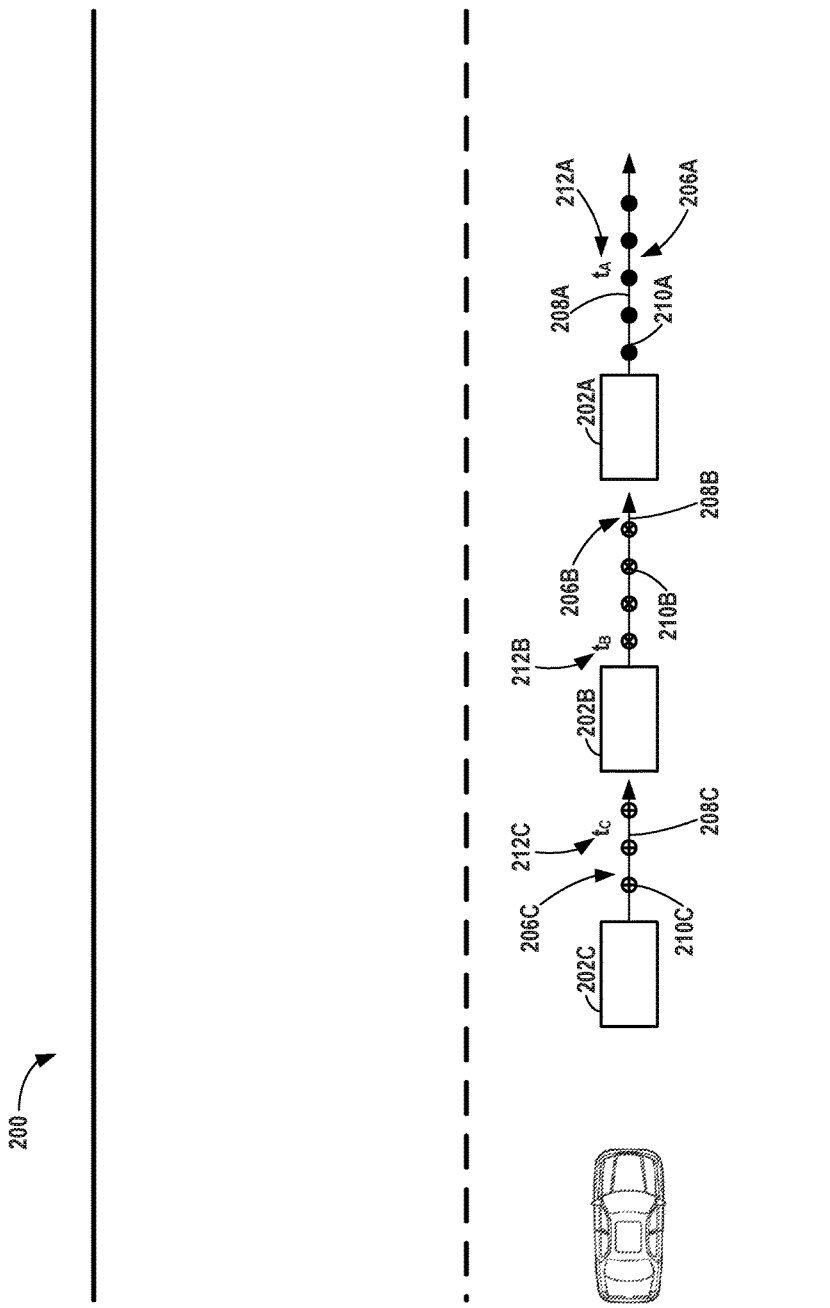

The following provides an example of the vehicle computing system 102 sequentially determining a second predicted motion trajectory 206B of the second object 202B based at least in part on the first predicted motion trajectory 206A of the first object 202A. For instance, the vehicle computing system 102 can determine the first predicted motion trajectory 206A of the first object 202A, as described herein. The vehicle computing system can then determine the second predicted motion trajectory 206B of the second object based at least in part on the state data 130 (e.g., the second state data associated with the second object 202B). This can be an initial predicted motion trajectory that indicates the second object 202B will travel into the first object 202A and/or within a minimum following distance (e.g., as shown in FIG. 2). Thus, the vehicle computing system 102 can adjust the second predicted motion trajectory 206B of the second object 202B based at least in part on the first predicted motion trajectory 206A of the first object 202A. For example, as shown in FIG. 3, the vehicle computing system 102 can remove, alter, etc. one or more of the way points 210B from the second path 208B based at least in part on the predicted motion trajectory 206A of the first object 202A. This can include, for example, the removal of the way point(s) 210B that would overlap and/or intersect with the first object 202A, a desired minimum following distance between the two objects, and/or the first predicted motion trajectory 206A of the first object 202A. Such removal can be based on the assumption that a follower object will travel in a manner to avoid a collision with a lead object and/or keep a safe distance with respect to the lead object. Additionally, or alternatively, the vehicle computing system 102 can adjust the associated second timing 212B with which the second object 202B is predicted to travel in accordance with the second path 208B (e.g., the way points 210B) based at least in part on the first predicted motion trajectory 206A of the first object 202A. For example, the vehicle computing system 102 can re-time the predicted motion trajectory 206B such that the second object 202B is not predicted to traverse the second path 208B in a manner that would result in a collision and/or encroachment of a safe following distance. In some implementations, the vehicle computing system 102 can adjust the second predicted motion trajectory 206B in other ways.

With reference again to FIG. 2, the vehicle computing system 102 can continue to sequentially determine the predicted motion trajectories of the objects within the travel lane 204 (e.g., in the lead-follower relationship). For example, the vehicle computing system 102 can determine a third predicted motion trajectory 206C of the third object 202C based at least in part on the state data 130 (e.g., the third state data associated with the third object 202C). The third predicted motion trajectory 206C of the third object 202C can be indicative of a third path 208C that the third object 202C is predicted to travel. The third path 208C that the third object 202C is predicted to travel can include or be made up of a plurality of third way points 210C. The third predicted motion trajectory 206C of the third object 202C can be indicative of an associated third timing 212C with which the third object 202C is predicted to travel in accordance with the third path 208C. The third predicted motion trajectory 206C can be an initial trajectory that indicates the third object 202C will travel into the second object 202B and/or within a desired following distance (e.g., as shown in FIG. 2).

The vehicle computing system 102 can identify the third object 202C as a follower object with respect to the second object 202B. Accordingly, the vehicle computing system can also determine the third predicted motion trajectory 206C of the third object 202C based at least in part on the second predicted motion trajectory 206B of the second object 202B. For instance, the vehicle computing system 102 can adjust the third predicted motion trajectory 206C of the third object 202C based at least in part on the second predicted motion trajectory 206B of the second object 202B. By way of example, as shown in FIG. 3, the vehicle computing system 102 can remove, alter, etc. one or more of the way points 210C from the third path 208C based at least in part on the second predicted motion trajectory 206B of the second object 202B. Additionally, or alternatively, the vehicle computing system 102 can adjust the associated third timing 212C with which the third object 202C is predicted to travel in accordance with the third path 208C (e.g., the way points 210C) based at least in part on the second predicted motion trajectory 206B of the second object 202B. The vehicle computing system 102 can continue such sequential trajectory development until it has predicted the motion trajectories for all the objects within a particular lead-follower relationship.

Returning to FIG. 1, the vehicle computing system 102 can output data indicative of one or more of the predicted motion trajectories (e.g., of the objects 202A-C). For example, the prediction system 126 can output this data to the motion planning system 128. The vehicle computing system 102 (e.g., the motion planning system 128) can determine a motion plan 138 for the vehicle 104 based at least in part on at least one of the first predicted motion trajectory 206A of the first object 202A, the second predicted motion trajectory 206B of the second object 202B, and/or the third predicted motion trajectory 206C of the third object 202C. A motion plan 138 can include vehicle actions (e.g., planned vehicle trajectories, speed(s), acceleration(s), other actions, etc.) with respect to the objects proximate to the vehicle as well as the objects' predicted movements. For instance, the motion planning system 128 can implement an optimization algorithm, model, etc. that considers cost data associated with a vehicle action as well as other objective functions (e.g., cost functions based on speed limits, traffic lights, etc.), if any, to determine optimized variables that make up the motion plan 136. The motion planning system 128 can determine that the vehicle 104 can perform a certain action (e.g., pass an object) without increasing the potential risk to the vehicle 104 and/or violating any traffic laws (e.g., speed limits, lane boundaries, signage, etc.). For instance, the motion planning system 128 can evaluate one or more of the predicted motion trajectories 206A-C of the first, second, and/or third objects 202A-C during its cost data analysis as it determines an optimized vehicle trajectory through the surrounding environment 200. The motion planning system 128 can generate cost data associated with such trajectories. In some implementations, one or more of the predicted motion trajectories 206A-C may not ultimately change the motion of the vehicle 104 (e.g., due to an overriding factor such as a jaywalking pedestrian). In some implementations, the motion plan 138 may define the vehicle's motion such that the vehicle 104 avoids the object(s) 202A-C, reduces speed to give more leeway one or more of the object(s) 202A-C, proceeds cautiously, performs a stopping action, etc.

The motion planning system 128 can be configured to continuously update the vehicle's motion plan 138 and a corresponding planned vehicle motion trajectory. For example, in some implementations, the motion planning system 128 can generate new motion plan(s) 138 for the vehicle 104 (e.g., multiple times per second). Each new motion plan can describe motion of the vehicle 104 over the next planning period (e.g., next several seconds). Moreover, a new motion plan may include a new planned vehicle motion trajectory. Thus, in some implementations, the motion planning system 128 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 104.

The vehicle computing system 102 can cause the vehicle 104 to initiate a motion control in accordance with at least a portion of the motion plan 138. For instance, the motion plan 138 can be provided to the vehicle control system(s) 116 of the vehicle 104. The vehicle control system(s) 116 can be associated with a vehicle controller (e.g., including a vehicle interface) that is configured to implement the motion plan 138. The vehicle controller can, for example, translate the motion plan into instructions for the appropriate vehicle control component (e.g., acceleration control, brake control, steering control, etc.). By way of example, the vehicle controller can translate a determined motion plan 138 into instructions to adjust the steering of the vehicle 104 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 138 (e.g., by sending control signal(s), making the translated plan available, etc.). This can allow the vehicle 104 to autonomously travel while taking into account the objects and their traffic interactions within the vehicle's surrounding environment (e.g., the lead/follower objects within the vehicle's travel lane).

Figure 4:
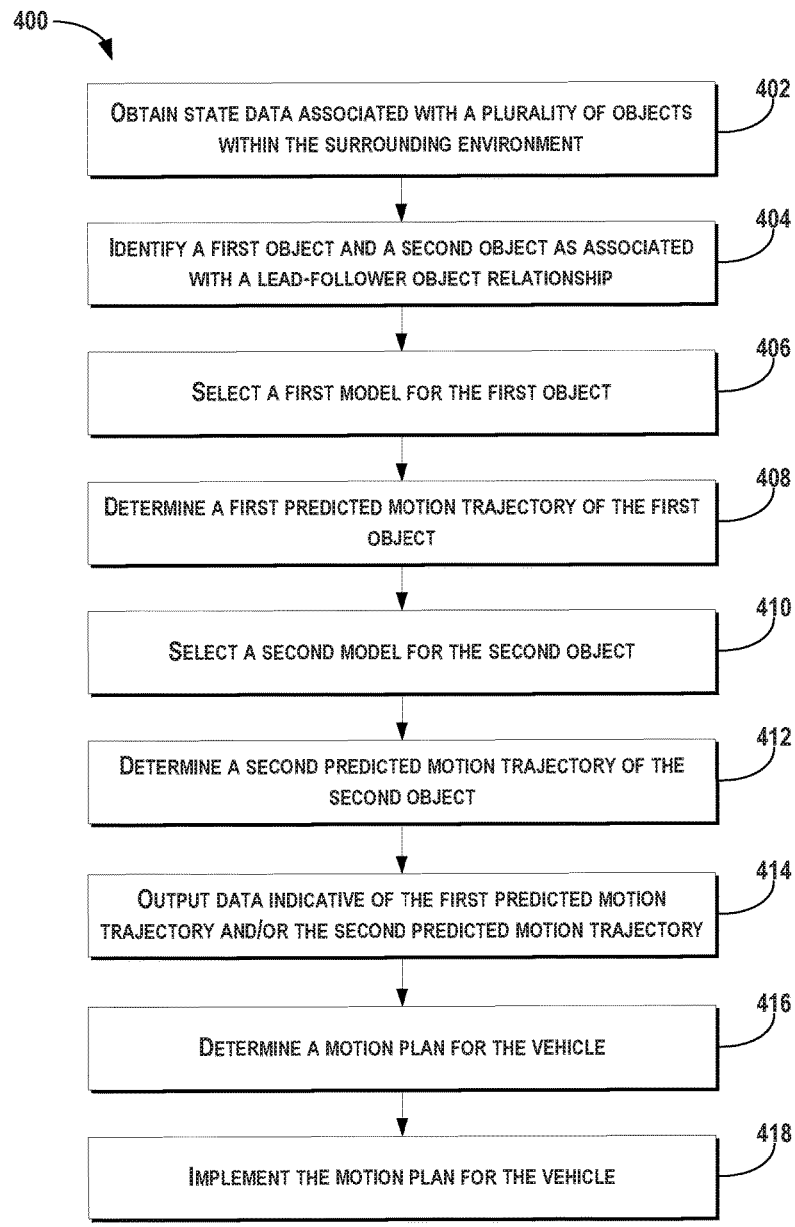
FIG. 4 depicts a flow diagram of an example method for determining object motion according to example embodiments of the present disclosure.

FIG. 4 depicts a flow diagram of an example method 400 for determining object motion and controlling vehicle motion according to example embodiments of the present disclosure. One or more portion(s) of the method 400 can be implemented by one or more computing devices such as, for example, the one or more computing device(s) of the vehicle computing system 102 and/or other systems. Each respective portion of the method 400 can be performed by any (or any combination) of the one or more computing devices. Moreover, one or more portion(s) of the method 400 can be implemented as an algorithm on the hardware components of the device(s) described herein (e.g., as in FIGS. 1 and 5), for example, to determine object motion and control a vehicle with respect to the same. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining state data associated with a plurality of objects within the surrounding environment. The vehicle computing system 102 can obtain state data 130 indicative of a plurality of states of a plurality of objects 202A-C within a surrounding environment 200 of a vehicle 104. For example, the vehicle computing system 102 can obtain state data 130 indicative of one or more current or past states of a first object 202A and/or a second object 202B within a surrounding environment 200 of the vehicle 104. This can include first state data associated with the first object 202A and/or second state data associated with the second object 202B.

At (404), the method 400 can include identifying a first object and a second object as associated with a lead-follower relationship. For instance, the vehicle computing system 102 can identify the first object 202A and the second object 202B as associated with a lead-follower relationship. The first object 202A can be a lead object and the second object 202B can be a follower object, as described herein. For instance, the vehicle computing system 102 can determine that the first object 202A may affect the motion of the second object 202B (e.g., within the travel lane 204). By way of example, the vehicle computing system 102 can determine that the first object 202A and the second object 202B are both located in a travel lane 204 (the same travel lane). In some implementations, the vehicle 104 can also be located within the travel lane 204. The vehicle computing system 102 can determine that the first object 202A is located ahead of the second object 202B within the travel lane 204 (e.g., immediately ahead of the second object 202B).

In some implementations, the vehicle computing system 102 can predict that at least two objects will be associated with a lead-follower relationship. For instance, the vehicle computing system 102 can determine that at least one the object (e.g., the second object 202B) is predicted to enter into a travel lane (e.g., travel lane 204) in which another object (e.g., the first object 202A) is located (and/or predicted to be located). The vehicle computing system 102 can make such a determination based at least in part on the state data 130 (e.g., associated with these objects) and/or on the predicted motion trajectories of each of these objects. The vehicle computing system 102 can determine that the motion of the at least one object that is predicted to enter into the travel lane may be affected and/or affect the motion of the other object. For example, the vehicle computing system 102 can determine that one of the objects (e.g., first object 202A) will be located ahead of another object (e.g., second object 202B) in the same travel lane (e.g., when the second object 202B enters the travel lane). The vehicle computing system 102 can determine that the objects are travelling in a similar direction. Additionally, or alternatively, the vehicle computing system 102 can determine that the objects are within a threshold distance from one another (e.g., 25 feet, 50 feet, 100 feet, within a certain following distance, etc.). In this way, the vehicle computing system 102 can identify and plan for future predicted lead-follower relationships.

At (406), the method 400 can include selecting a first model for the first object. For instance, the vehicle computing system 102 can select, from a plurality of models, a first model 134 for the first object 202A based at least in part on the state data 130 (e.g., the first state data associated with the first object 202A). The first model 134 can be selected based at least in part on a first type of the first object 202A (e.g., car vs. truck, etc.). Additionally, or alternatively, the first model 134 can be selected based on the role of the first object 202A in the lead-follower relationship. For example, the vehicle computing system 102 can select the first model 134 (e.g., a lead object model) based on the first object 202A being a lead object. The vehicle computing system 102 can access a memory (e.g., database) of a plurality of models (e.g., lead object models) to select the most appropriate model for predicting the motion of the first object 202A (e.g., a lead object).

At (408), the method 400 can include determining a first predicted motion trajectory of the first object. For instance, the vehicle computing system 102 can determine a first predicted motion trajectory 206A of the first object 202A based at least in part on the state data 130. The vehicle computing system 102 can determine the first predicted motion trajectory 206A based at least in part on a first model 134 (e.g., a lead object model). For instance, the vehicle computing system 102 can determine the first predicted motion trajectory 206A by processing the state data 130 associated with the first object 202A with the model (e.g., a traffic-flow model).

At (410), the method 400 can include selecting a second model for the second object. For instance, the vehicle computing system 102 can select, from a plurality of models, a second model 136 for the second object 202B based at least in part on the state data 130 (e.g., the second state data associated with the second object 202B). The second model 136 can be selected based at least in part on a second type of the second object 202B (e.g., car vs. truck, etc.). Additionally, or alternatively, the second model 136 can be selected based on the role of the second object 202B in the lead-follower relationship. For example, the vehicle computing system 102 can select the second model 136 (e.g., a follower object model) based on the second object 202B being a follower object. The vehicle computing system 102 can access a memory (e.g., database) of a plurality of models (e.g., follower object models) to select the most appropriate model for predicting the motion of the second object 202B (e.g., a follower object). The plurality of models and/or the accessible memory from which the second model 136 is selected can be different that the plurality of models and/or the accessible memory from which the first model 134 is selected.

At (412), the method 400 can include determining a second motion trajectory of the second object. The vehicle computing system 102 can determine a second predicted motion trajectory 206B of the second object 202B based at least in part on the state data 130 (e.g., associated with the second object 202B) and the first predicted motion trajectory 206A of the first object 202A. As described herein, the vehicle computing system 102 can determine the second predicted motion trajectory 206B based at least in part on a second model 202B (e.g., that is different than the first model 202A).

For instance, the vehicle computing system 102 can determine a path 206B of the second predicted motion trajectory 206B based at least in part on the state data 130. The vehicle computing system 102 can determine a timing 212B with which the second object 202B is predicted to travel in accordance with the path 206B based at least in part on the first predicted motion trajectory 206A of the first object 202A. For example, the vehicle computing system 102 can determine the timing 212B such that the second predicted trajectory 206A indicates that that the second object 202B will traverse the path 208B in a manner that does not result in a collision with the first object 202A and/or the second object 202B encroaching, moving beyond, exceeding, etc. a minimum distance between the second object 202B and the first object 202A (e.g., a one vehicle length per 5 mph, assured clear distance ahead, multiple-second rule associated distance, other minimum following distance, etc.).

At (414), the method 400 can include outputting data indicative of the first predicted motion trajectory and/or the second predicted motion trajectory. For instance, the vehicle computing system 102 can output data indicative of the first predicted motion trajectory 206A of the first object 202A and/or the second predicted motion trajectory 206B of the second object 202B. Such data can be outputted from the prediction system 126 to the motion planning system 128 and/or outputted to a memory (e.g., onboard the vehicle 104). The vehicle computing system 102 can determine a motion plan 138 for the vehicle 104 based at least in part on the first predicted motion trajectory 206A of the first object 202A and/or the second predicted motion trajectory 206B of the second object 202B, at (416). The vehicle computing system 102 can implement the motion plan 138 for the vehicle 104, at (418). For instance, the vehicle computing system 102 can cause the vehicle 104 to initiate a motion control in accordance with at least a portion of the motion plan 138, as described herein.

Figure 5:
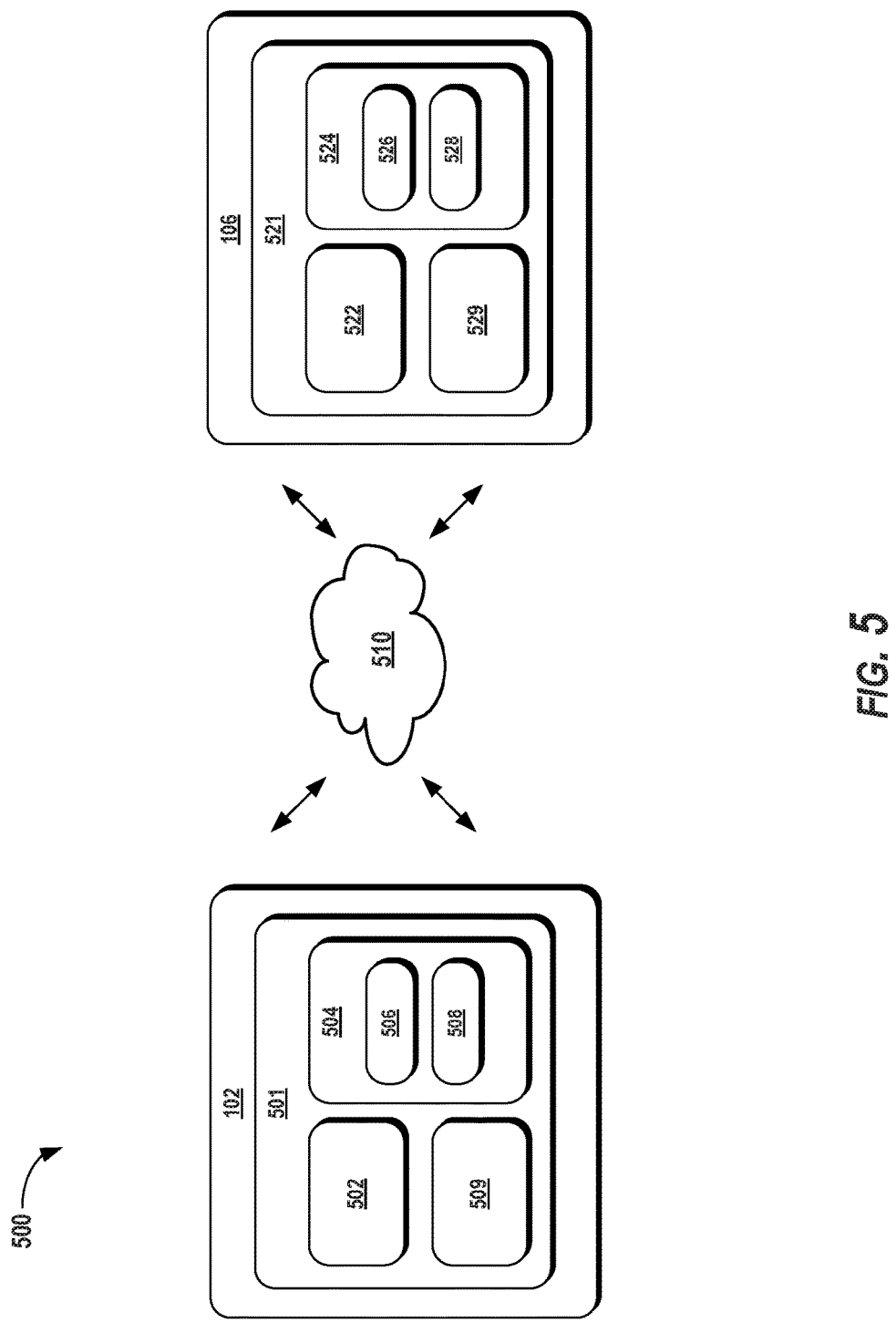
FIG. 5 depicts example system components according to example embodiments of the present disclosure.

FIG. 5 depicts an example system 500 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 102 of the vehicle 104 and the operations computing system 106 that can be communicatively coupled to one another over one or more network(s) 510.

The computing device(s) 501 of the vehicle computing system 102 can include processor(s) 502 and a memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, data registrar, etc., and combinations thereof.

The memory 504 can store information that can be accessed by the one or more processors 502. For instance, the memory 504 (e.g., one or more non-transitory computer-readable storage mediums, memory devices) on-board the vehicle 104 can include computer-readable instructions 506 that can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the vehicle 104 can store instructions 506 that when executed by the one or more processors 502 on-board the vehicle 104 cause the one or more processors 502 (the vehicle computing system 102) to perform operations such as any of the operations and functions of the vehicle computing system 102, the operations and functions for determining object motion and controlling autonomous vehicle motion (e.g., one or more portions of method 400), any of the operations and functions for which the vehicle computing system 102 is configured, and/or any other operations and functions of the vehicle computing system 102, as described herein.

The memory 504 can store data 508 that can be obtained, received, accessed, written, manipulated, created, and/or stored. The data 508 can include, for instance, sensor data, map data, state data, models (e.g., traffic flow models, etc.), prediction data (e.g., indicative of predicted motion trajectories, paths, associated timing, etc.), motion planning data, and/or other data/information such as that described herein. In some implementations, the computing device(s) 501 can obtain data from one or more memories that are remote from the vehicle 104.

The computing device(s) 501 can also include a communication interface 509 used to communicate with one or more other system(s) on-board the vehicle 104 and/or a remote computing device that is remote from the vehicle 104 (e.g., of the operations computing system 106). The communication interface 509 can include any circuits, components, software, etc. for communicating via one or more networks (e.g., network(s) 510). In some implementations, the communication interface 509 can include, for example, one or more of a communications controller, receiver, transceiver, transmitter, port, conductors, software and/or hardware for communicating data.

The operations computing system 106 can include one or more computing device(s) 521 that are remote from the vehicle computing system 102. The computing device(s) 521 can include one or more processors 522 and a memory 524. The one or more processors 522 can be any suitable processing device (e.g., a processor core, a microprocessor, an ASIC, a FPGA, a controller, a microcontroller, etc.) and can be one processor or a plurality of processors that are operatively connected. The memory 524 can include one or more tangible, non-transitory computer-readable storage media, such as RAM, ROM, EEPROM, EPROM, one or more memory devices, flash memory devices, data registrar, etc., and combinations thereof.

The memory 524 can store information that can be accessed by the one or more processors 522. For instance, the memory 524 (e.g., one or more tangible, non-transitory computer-readable storage media, one or more memory devices, etc.) can include computer-readable instructions 526 that can be executed by the one or more processors 522. The instructions 526 can be software written in any suitable programming language or can be implemented in hardware. Additionally, or alternatively, the instructions 526 can be executed in logically and/or virtually separate threads on processor(s) 522.

For example, the memory 524 can store instructions 526 that when executed by the one or more processors 522 cause the one or more processors 522 to perform operations such as any of the operations and functions of the operations computing system 106 or for which the operations computing system 106 is configured, as described herein, and/or any other operations and functions described herein.

The memory 524 can store data 528 that can be obtained, received, accessed, written, manipulated, created, and/or stored. The data 528 can include, for instance, map data, data indicative of models (e.g., traffic flow models, etc.), data associated with one or more vehicles, and/or other data/information such as that described herein. In some implementations, the computing device(s) 521 can obtain data from one or more memories that are remote from the operations computing system 106 and/or are onboard the vehicle 104.

The computing device(s) 521 can also include a communication interface 529 used to communicate with one or more system(s) onboard the vehicle 104 and/or another computing device that is remote from the operations computing system 106. The communication interface 529 can include any circuits, components, software, etc. for communicating via one or more networks (e.g., network(s) 510). In some implementations, the communication interface 529 can include, for example, one or more of a communications controller, receiver, transceiver, transmitter, port, conductors, software and/or hardware for communicating data.

The network(s) 510 can be any type of network or combination of networks that allows for communication between devices. In some embodiments, the network(s) 510 can include one or more of a local area network, wide area network, the Internet, secure network, cellular network, mesh network, peer-to-peer communication link and/or some combination thereof and can include any number of wired or wireless links. Communication over the network(s) 510 can be accomplished, for instance, via a communication interface using any type of protocol, protection scheme, encoding, format, packaging, etc.

Computing tasks discussed herein as being performed at computing device(s) at the vehicle can instead be performed remote from the vehicle (e.g., via the operations computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle computing system, comprising:
one or more processors; and
one or more tangible, non-transitory, computer readable media that collectively store instructions that when executed by the one or more processors cause the vehicle computing system to perform operations comprising:
obtaining state data indicative of one or more current or past states of a first object and a second object within a surrounding environment of an autonomous vehicle, wherein the first object is located ahead of the second object in a travel lane, wherein the first object and the second object are associated with a lead-follower object relationship;
determining a first predicted motion trajectory of the first object based at least in part on the state data;
determining a second predicted motion trajectory of the second object based at least in part on the state data and the first predicted motion trajectory of the first object, wherein the second predicted motion trajectory of the second object is indicative of a path that the second object is predicted to travel and an associated timing with which the second object is predicted to travel in accordance with the path;
determining a motion plan for the autonomous vehicle based at least in part on the second predicted motion trajectory of the second object; and
causing the autonomous vehicle to initiate a motion control in accordance with at least a portion of the motion plan.

2. The computing system of claim 1, further comprising:
identifying the first object as a lead object and the second object as a follower object with respect to the lead object.

3. The computing system of claim 1, wherein determining the second predicted motion trajectory of the second object comprises:

determining the second predicted motion trajectory of the second object based at least in part on the state data; and adjusting the second predicted motion trajectory of the second object based at least in part on the first predicted motion trajectory of the first object.

4. The computing system of claim 3, wherein adjusting the second predicted motion trajectory of the second object based at least in part on the first predicted motion trajectory of the first object comprises:

adjusting the associated timing with which the second object is predicted to travel in accordance with the path based at least in part on the first predicted motion trajectory of the first object.

5. The computing system of claim 3, wherein the path that the second object is predicted to travel comprises a plurality of way points, and wherein adjusting the second predicted motion trajectory of the second object based at least in part on the first predicted motion trajectory of the first object comprises:

removing one or more of the way points from the path based at least in part on the predicted motion trajectory of the first object.

6. The computing system of claim 1, wherein determining the first predicted motion trajectory of the first object further comprises:

determining the first predicted motion trajectory of the first object based at least in part on a first model.

7. The computing system of claim 6, wherein determining the second predicted motion trajectory of the second object further comprises:

determining the second predicted motion trajectory of the second object based at least in part on a second model that is different from the first model.

8. The computing system of claim 7, wherein the operations further comprise:

selecting, from a plurality of models, the first model for the first object based at least in part on the state data; and selecting, from the plurality of models, the second model for the second object based at least in part on the state data.

9. The computing system of claim 8, wherein the first model is selected based at least in part on a first type of the first object, and wherein the second model is based at least in part on a second type of the second object.

10. The computing system of claim 7, wherein the first object is a lead vehicle and the second object is a follower vehicle, and wherein the first model is a lead vehicle model and the second model is a follower vehicle model.

11. The computing system of claim 7, wherein the first model is a traffic-flow model and the second model is a rule-based model.

12. A computer-implemented method for determining object motion, comprising:

obtaining, by a computing system comprising one or more computing devices, state data indicative of one or more current or past states of a first object and a second object within a surrounding environment of an autonomous vehicle, wherein the first object is located ahead of the second object in a travel lane, wherein the first object and the second object are associated with a lead-follower object relationship;

determining, by the computing system, a first predicted motion trajectory of the first object based at least in part on the state data;

determining, by the computing system, a second predicted motion trajectory of the second object based at least in part on the state data and the first predicted motion trajectory of the first object; and outputting, by the computing system, data indicative of the second predicted motion trajectory of the second object; and determining, by the computing system, a motion plan for the autonomous vehicle based at least in part on the second predicted motion trajectory of the second object; and causing, by the computing system, the autonomous vehicle to initiate a motion control in accordance with at least a portion of the motion plan.

13. The computer-implemented method of claim 12, further comprising:

identifying, by the computing system, the first object and the second object as associated with a lead-follower relationship.

14. The computer-implemented method of claim 13, wherein identifying the first object and the second object as associated with the lead-follower relationship comprises:

determining, by the computing system, that the first object and the second object are both located in the travel lane; and determining, by the computing system, that the first object is located ahead of the second object within the travel lane.

15. The computer-implemented method of claim 12, wherein determining the first predicted motion trajectory of the first object comprises determining, by the computing system, the first predicted motion trajectory based at least in part on a first model, and wherein determining the second predicted motion trajectory of the second object comprises determining, by the computing system, the second predicted motion trajectory based at least in part on a second model that is different than the first model.

16. The computer-implemented method of claim 12, wherein determining the second predicted motion trajectory of the second object comprises:

determining, by the computing system, a path of the second predicted motion trajectory based at least in part on the state data; and determining, by the computing system, a timing with which the second object is predicted to travel in accordance with the path based at least in part on the first predicted motion trajectory of the first object.

17. The computer-implemented method of claim 12, further comprising:

determining, by the computing system, a motion plan for the autonomous vehicle based at least in part on the second predicted motion trajectory of the second object; and causing, by the computing system, the autonomous vehicle to initiate a motion control in accordance with at least a portion of the motion plan.

18. An autonomous vehicle comprising:

a computing system that comprises one or more processors and one or more tangible, non-transitory, computer readable media that collectively store instructions that when executed by the one or more processors cause the computing system to perform operations comprising:

obtaining state data indicative of one or more current or past states of a first object and a second object, wherein the first object is located ahead of the second object in a travel lane, wherein the first object and the second object are associated with a lead-follower object relationship;

determining a first predicted motion trajectory of the first object based at least in part on the state data;

determining a second predicted motion trajectory of the second object based at least in part on the first predicted motion trajectory of the first object;

determining a motion plan for the autonomous vehicle based at least in part on the second predicted motion trajectory of the second object; and causing the autonomous vehicle to initiate a motion control in accordance with at least a portion of the motion plan.

19. The autonomous vehicle of claim 18, wherein determining the second predicted motion trajectory for the second object comprises:

determining the second predicted motion trajectory of the second object based at least in part on the state data, wherein the second predicted motion trajectory is indicative of a path that the second object is predicted to travel and an associated timing with which the second object is predicted to travel in accordance with the path; and adjusting the associated timing with which the second object is predicted to travel in accordance with the path based at least in part on the first predicted motion trajectory of the first object.

20. The autonomous vehicle of claim 18, wherein the autonomous vehicle is located within the travel lane.

* * * * *